Feb. 11, 1930.  P. M. GELATT  1,746,828
TANDEM FLOAT OPERATED GAUGE

Filed Sept. 7, 1926

INVENTOR.
Philo M. Gelatt
BY
Haley & Bowman
ATTORNEYS.

Patented Feb. 11, 1930

1,746,828

UNITED STATES PATENT OFFICE

PHILO M. GELATT, OF LA CROSSE, WISCONSIN, ASSIGNOR, BY MESNE ASSIGNMENTS, TO MOTO METER GAUGE & EQUIPMENT CORPORATION, OF LONG ISLAND CITY, NEW YORK, A CORPORATION OF DELAWARE

TANDEM-FLOAT-OPERATED GAUGE

Application filed September 7, 1926. Serial No. 133,810.

This invention relates to gasoline gauges for the tanks of motor vehicles, it particularly relating to gauges of the float-operated type.

The object of the invention is to provide an improved form of float which will be responsive to the level of the liquid fuel in such a way as to indicate the mean depth thereof when the liquid stands at different depths in the tank when one part of the tank is higher than the other. An important advantage of such a float arrangement is that it minimizes the effect of surging of the liquid due to the movement of the tank, incidental for example, to its use as a fuel container on an automobile.

A further and more specific object of the invention is to provide a pair of widely separated but rigidly connected floats having a pivotal connection with the gauge devices so that both floats may remain at the liquid level as the depth of the liquid varies in different portions of the tank and operate the gauge devices to indicate the average or mean depth of the liquid.

Figure 1:
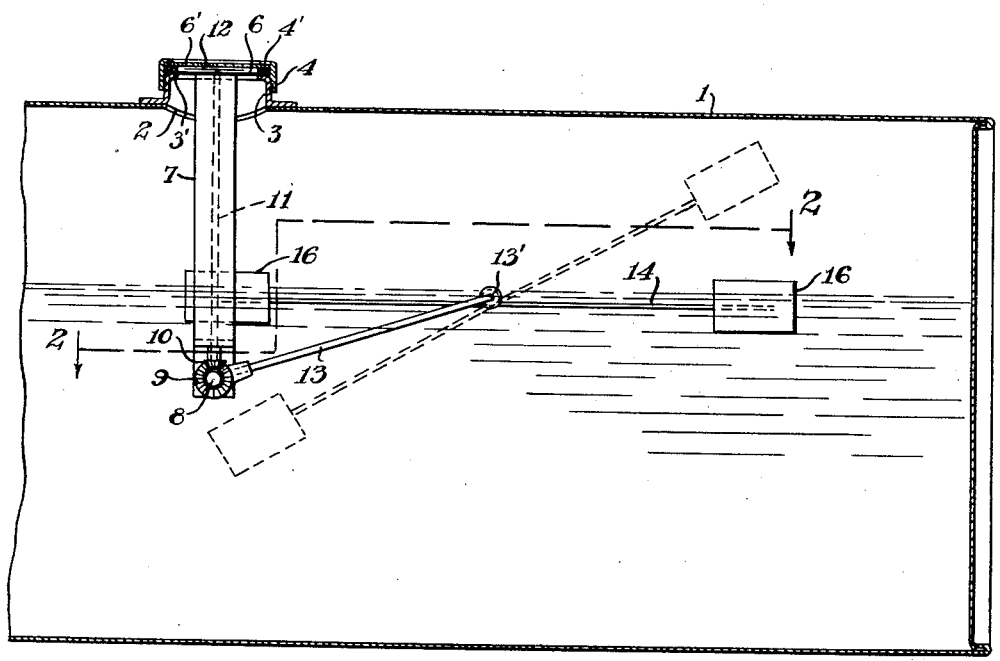
Fig. 1 is a section of a portion of a gasoline tank showing my improved gauge applied thereto.
Figure 2:
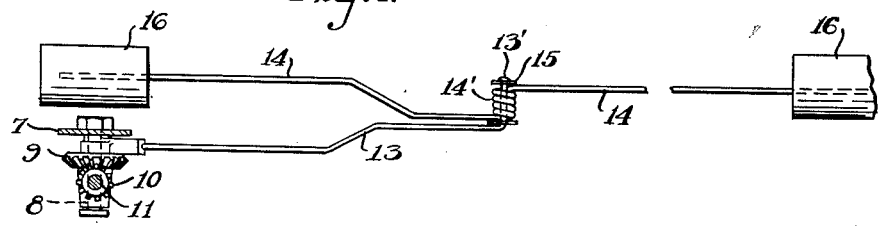
Fig. 2 is a section on the line 2—2 of Fig. 1 on an enlarged scale with the tank omitted.

Referring to the drawings, 1 represents a tank having an opening 2 surrounded by the neck 3. The gauge devices other than the float are of a form now in common use consisting of a cap 4 having the inturned flange 4' which clamps the dial and sealing plate 6 and glass cover 6' to the inturned flange 3' on the neck 3. A bracket 7 depends from the plate 6 and supports at its lower end a shaft 8 having a beveled gear 9 which meshes with a beveled pinion 10 on the lower end of the indicator shaft 11 which is also supported by the bracket with its upper end extending through the plate 6 in the present case and having a pointer 12. The hub of the gear 9 has secured thereto a projecting arm 13. In prior constructions it has been usual to connect a single float with the free end of this arm. In the present case there is pivoted on the bent free end 13' of this arm the central portion of a connecting rod 14, the central portion of this rod being wound into a series of coil turns as indicated at 14' to provide a sleeve which is journaled on the bent portion 13'; a pin 15 holding the sleeve on the journal. To each end of this rod 14 is secured a float 16.

The result of this construction is that both floats coact to turn the pointer 12 through the shaft 11, pinion 10, gear 9 and arm 13. The parts are so positioned that both floats remain at the liquid level regardless of the variation in the depth of the liquid due to tilting of the tank. As the depth of the fuel varies in different portions of the tank one float may rise and the other fall by reason of the pivotal connection between the connecting rod 14 and the arm 13, resulting in the floats moving the parts so as to correctly indicate the mean depth of the liquid.

In inserting the indicating device in the tank, the connecting rod 14 and the floats as well as the arm 13 may be swung to a position substantially in line with the bracket 7 so as to be readily inserted through the opening 2.

Having thus described my invention, I claim:

1. The combination of a liquid receptacle, having a relatively small opening therein, with a unitary gauge structure insertable through said opening, said gauge structure comprising a bracket; an oscillatory indicator shaft journaled in said bracket; a plate of greater dimensions than said opening; a member secured to the upper end of said indicator shaft and movable over said plate; an actuating arm connected at one end with said shaft; an elongated float device, having two floats spaced at a substantial distance apart with a substantially rigid connecting member, mounted on the free end of said actuating arm, the length of said arm being substantially the depth of said tank; and a swivel connection between said free end of the actuating arm and said elongated float device whereby said float device is capable of swinging from a substantially horizontal position to a substantially vertical position while positioned within the tank to enable the structure to be removed in its unitary condition from said tank.

2. The combination of a liquid receptacle, having a relatively small opening therein, with a unitary gauge structure insertable through said opening, said gauge structure including a bracket; an oscillatory indicator shaft journaled in said bracket; an actuating arm connected at one end with said shaft; an elongated float device, having two floats spaced at a substantial distance apart with a substantially rigid connecting member, mounted on the free end of said actuating arm, the length of said arm being substantially the depth of said tank; and a swivel connection between said actuating arm and said elongated float device whereby said float device is capable of swinging from a substantially horizontal position to a substantially vertical position while positioned within the tank to enable the structure to be removed in its unitary condition from said tank.

In testimony whereof, I have hereunto set my hand this 31st day of August, 1926.

PHILO M. GELATT.